(12) United States Patent
Liu

(10) Patent No.: US 7,300,231 B1
(45) Date of Patent: Nov. 27, 2007

(54) CUTTING TOOL CARRYING DEVICE FOR MACHINE TOOL

(76) Inventor: Hsing Chao Liu, No. 58, Lane 20, Dafu Road, Sherngan Hsiang, Taichung Hsien (TW) 42946

( * ) Notice: Subject to any disclaimer, the term of this patent is extended or adjusted under 35 U.S.C. 154(b) by 0 days.

(21) Appl. No.: 11/633,606

(22) Filed: Dec. 4, 2006

(51) Int. Cl.
*B26D 1/12* (2006.01)

(52) U.S. Cl. .............. 407/44; 407/67; 407/47; 407/73; 407/77; 407/79

(58) Field of Classification Search .......... 407/44–47, 407/66–69, 73, 75–79, 85–88
See application file for complete search history.

(56) References Cited

U.S. PATENT DOCUMENTS

| | | | |
|---|---|---|---|
| RE28,416 E | | 5/1975 | Hougenn |
| 4,318,647 A | * | 3/1982 | Erkfritz ................ 408/153 |
| 4,393,735 A | | 7/1983 | Eckle et al. .............. 82/36 R |
| 4,797,039 A | * | 1/1989 | Bosek ................... 407/87 |
| 5,333,659 A | * | 8/1994 | Carpenter et al. .......... 144/231 |
| 5,658,101 A | * | 8/1997 | Hammer ................. 407/37 |
| 5,667,343 A | * | 9/1997 | Hessman et al. ............ 407/36 |
| 5,957,176 A | * | 9/1999 | Stein ..................... 144/230 |
| RE36,659 E | * | 4/2000 | Toogood ................. 144/220 |
| 6,942,432 B2 | * | 9/2005 | Noggle et al. ............. 407/40 |
| 7,048,476 B2 | * | 5/2006 | Misenheimer et al. ........ 407/67 |
| 7,163,360 B2 | * | 1/2007 | Toyose ................... 407/36 |

* cited by examiner

*Primary Examiner*—Willmon Fridie, Jr.
(74) *Attorney, Agent, or Firm*—Charles E. Baxley

(57) ABSTRACT

A cutting tool carrying device includes a carrying member having one or more compartments formed in an outer peripheral portion each for receiving a base member, and a follower slidably engaged into each of the base members for supporting a cutting member. An adjusting device may adjust the follower relative to the base member to partially extend the cutting member out of the outer peripheral portion of the carrying member for suitably machining the work pieces. A pressing device may be slidably attached to the base member for forcing the cutting member to the base member and for allowing the cutting member to be adjusted relative to the base member and the carrying member to the suitable positions.

17 Claims, 7 Drawing Sheets

CUTTING TOOL CARRYING DEVICE FOR MACHINE TOOL

BACKGROUND OF THE INVENTION

1. Field of the Invention

The present invention relates to a cutting tool carrying device for a machine tool or a wood working machine, and more particularly to a cutting tool carrying device for a wood working machine including a blade carrier for allowing the cutting tools to be adjusted relative to the tool carrier to a suitable or selected position.

2. Description of the Prior Art

Typical cutting tools have been provided for attaching to various machine tools, such as wood working machines, lathe tools, milling machines, or the like and comprise a cutter body having a number of regularly spaced cutting teeth formed or provided thereon for cutting or milling or machining the work pieces.

For example, U.S. Pat. No. Re. 28,416 to Hougen discloses one of the typical annular hole cutter also comprising a cutter body having a number of regularly spaced cutting teeth formed or provided thereon for cutting or milling or machining the work pieces. However, the regularly spaced cutting teeth are solidly formed on the cutter body and may not be adjusted relative to the cutter body to any suitable or selected position.

U.S. Pat. No. 4,393,735 to Eckle et al. discloses another typical cutting plate carrier insertable in a holder of a machine tool, in particular a lathe tool and comprising one or more hexagonal cutting plates for attaching or securing to tool holders. However, the hexagonal cutting plates are also solidly attached or secured to the tool holders and also may not be adjusted relative to the tool holders to any suitable or selected position.

The present invention has arisen to mitigate and/or obviate the afore-described disadvantages of the conventional cutting tool carrying devices.

SUMMARY OF THE INVENTION

The primary objective of the present invention is to provide a cutting-tool carrying device including a blade carrier for allowing the cutting tools to be adjusted relative to the tool carrier to a suitable or selected position.

In accordance with one aspect of the invention, there is provided a cutting tool carrying device comprising a carrying member including at least one compartment formed in an outer peripheral portion thereof, a base member fitted into the compartment of the carrying member and including at least one orifice formed therein, a follower slidably engaged into the orifice of the base member, a cutting member attached to and supported on the follower and extended out of the outer peripheral portion of the carrying member, and an adjusting device for adjusting the follower and the cutting member relative to the base member and the outer peripheral portion of the carrying member and for allowing the cutting member to be adjusted relative to the base member and the carrying member to the suitable positions.

The adjusting device includes a fastener threaded with the follower and the base member for moving the follower relative to the base member. The follower and the base member each include a screw holes formed therein for threading with the fastener. The fastener includes two threaded segments having different threading directions for threadedly engaging with the screw holes of the follower and the base member respectively.

The base member includes at least one orifice formed therein for slidably receiving the follower. The base member includes a channel formed therein and communicating with the orifice of the base member, and the follower includes a seat extended outwardly therefrom and slidably engaged into the channel of the base member for guiding the follower to slide along the orifice of the base member and for preventing the follower from being rotated relative to the base member.

The seat of the follower includes a recess formed therein for engaging with the cutting member and for supporting the cutting member. The follower includes an aperture formed therein and formed through the seat for slidably receiving a detent which is engageable with the cutting member. The cutting member includes at least one hole formed therein for slidably receiving the anchoring detent.

The base member includes a cut-off portion formed therein for forming a carrying surface therein and for engaging with the cutting member. The base member includes a pressing device for engaging with the cutting member and for forcing the cutting member to the base member or against the base member. The pressing device includes a pressing surface formed therein for engaging with the cutting member and for forcing the cutting member to the base member.

The pressing device includes a fastener threaded with the base member for moving the pressing device relative to the base member. The pressing device and the base member each include a screw holes formed therein for threading with the fastener. The fastener includes two threaded segments having different threading directions for threadedly engaging with the screw holes of the pressing device and the base member respectively and for moving or adjusting the pressing device relative to the base member to different positions.

The carrying member includes an inner peripheral space formed therein and communicating with the compartment of the carrying member and having an inner diameter greater than that of the compartment of the carrying member for forming an inner peripheral shoulder in the compartment of the carrying member, and at least one slot formed in the compartment and communicating with the compartment and the inner peripheral space of the carrying member, the base member includes at least one catch extended outwardly therefrom for engaging with the slot of the carrying member and for allowing the catch of the base member to be engaged into the inner peripheral space of the carrying member and for anchoring or positioning the base member to the carrying member.

The base member includes a screw hole formed therein for threadedly engaging with a fastener which is engageable with the carrying member in order to force the base member to move relative to the carrying member and to force the at least catch of the base member to engaged with the inner peripheral shoulder of the carrying member and to anchor the base member to the carrying member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
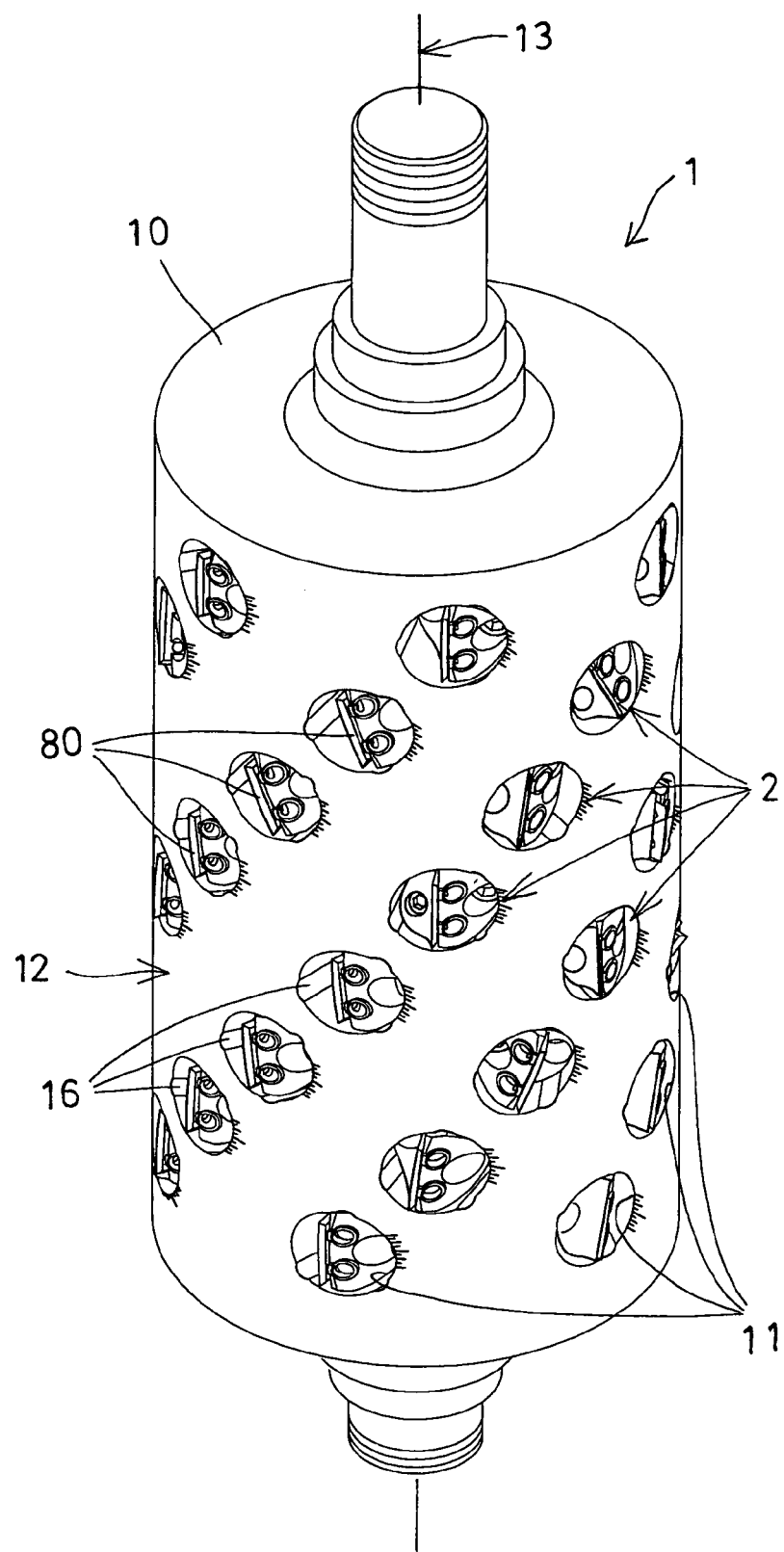
FIG. 1 is a perspective view of a cutting tool carrying device in accordance with the present invention.
Figure 2:
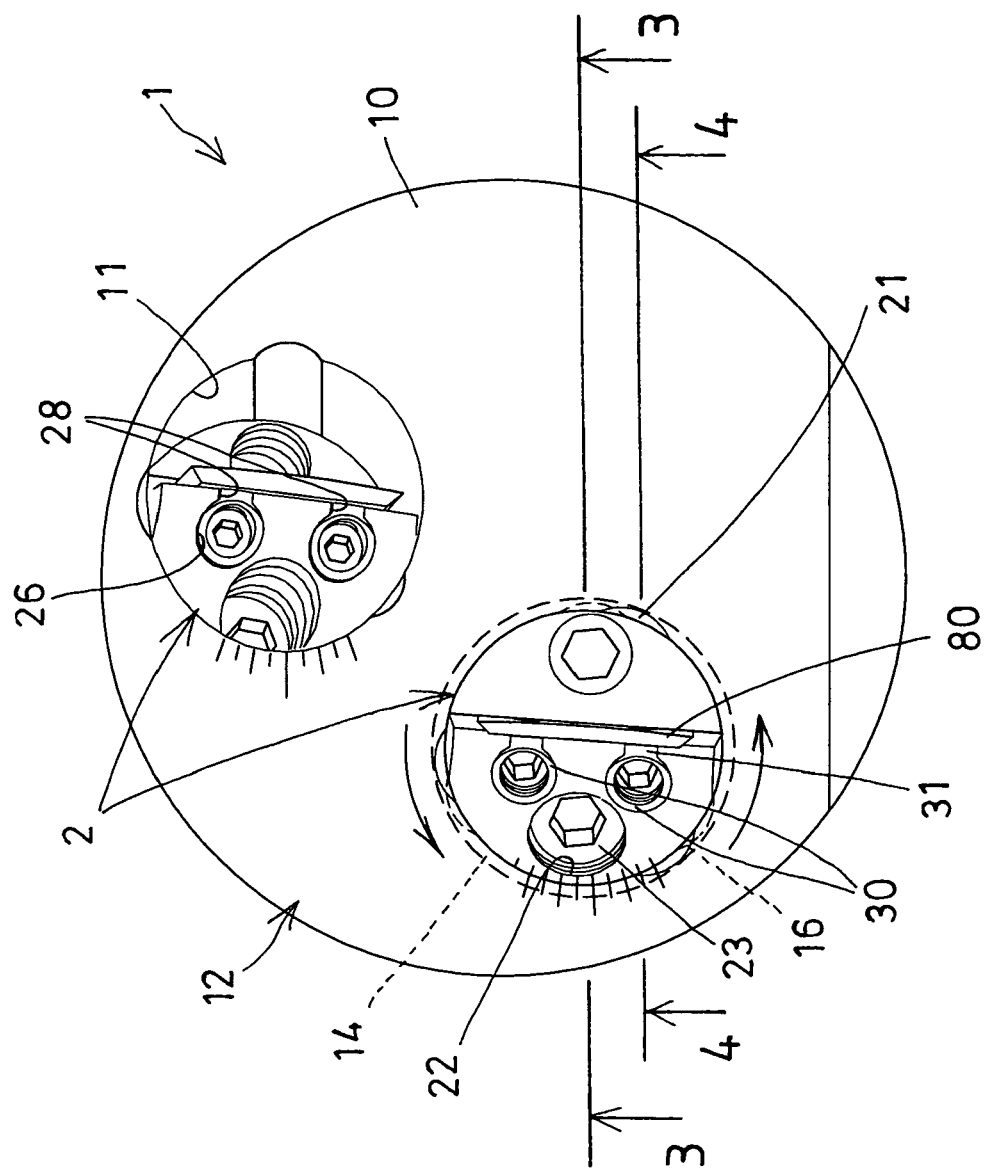
FIG. 2 is an enlarged partial plan schematic view of the cutting tool carrying device.

Referring to the drawings, and initially to FIGS. 1-4, a cutting tool carrying device 1 in accordance with the present invention comprises a carrying body or member 10 preferably, but not necessarily including a cylindrical structure as shown in FIG. 1 and including a number of compartments 11 formed in the outer peripheral portion 12 of the carrying member 10 and preferably inclined or tilted or perpendicular to a longitudinal axis 13 (FIG. 1) of the carrying member 10, and a number of tool holding devices 2 engageable into the compartments 11 of the carrying member 10 respectively each for adjustably attaching or holding or supporting a cutting member 80.

The carrying member 10 includes an enlarged inner peripheral space 14 formed in each of the compartments 11 and communicating with the compartments 11 of the carrying member 10 respectively and having an inner diameter greater than that of the compartment 11 of the carrying member 10 for forming or defining an inner peripheral shoulder 15 in each of the compartments 11 of the carrying member 10, best shown in FIGS. 2-5, and further includes one or more slots 16 formed in each of the compartments 11 (FIGS. 1, 2) and communicating with the compartments 11 and the peripheral space 14 of the carrying member 10 respectively, and provided for anchoring or positioning the tool holding devices 2 to the carrying member 10, the function of which will be discussed hereinafter.

For example, the tool holding devices 2 each include a seat or base member 20 having an outer diameter equals to or slightly smaller than that of the compartment 11 of the carrying member 10 for allowing the base member 20 to be snugly fitted or engaged into the compartments 11 of the carrying member 10 respectively. The base members 20 each include one or more catches 21 extended outwardly therefrom for engaging with the slots 16 of the compartments 11 of the carrying member 10 respectively and for allowing the catches 21 of the base member 20 to be fitted or engaged into the peripheral space 14 of the carrying member 10 after the catches 21 of the base member 20 are engaged through the slots 16 of the compartments 11 of the carrying member 10 and when the base member 20 is rotated relative to the carrying member 10.

The catches 21 of the base member 20 may thus be engaged with the inner peripheral shoulder 15 of the carrying member 10 for limiting the base member 20 to slide or to move relative to the carrying member 10 and for preventing the base member 20 from being disengaged from the carrying member 10. The base members 20 each include a screw hole 22 longitudinally formed therein or formed through the base members 20 (FIGS. 2-3, 6-8) for threadedly engaging with a bolt or fastener 23 which may be engaged with the carrying member 10 (FIG. 3) in order to force the base member 20 to slide or to move outwardly relative to the carrying member 10 and to force the catches 21 of the base member 20 to engaged with the inner peripheral shoulder 15 of the carrying member 10 and thus to anchor or secure the base member 20 to the carrying member 10.

Figure 4:
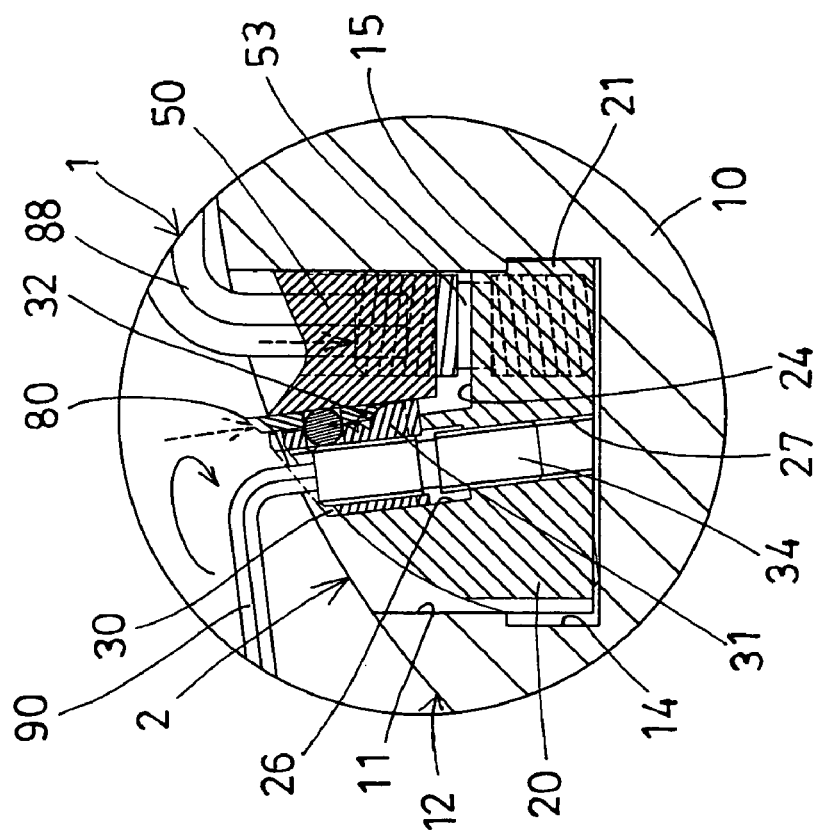
FIG. 4 is another partial cross sectional view of the cutting tool carrying device taken along lines 4-4 of FIG. 2.
Figure 5:
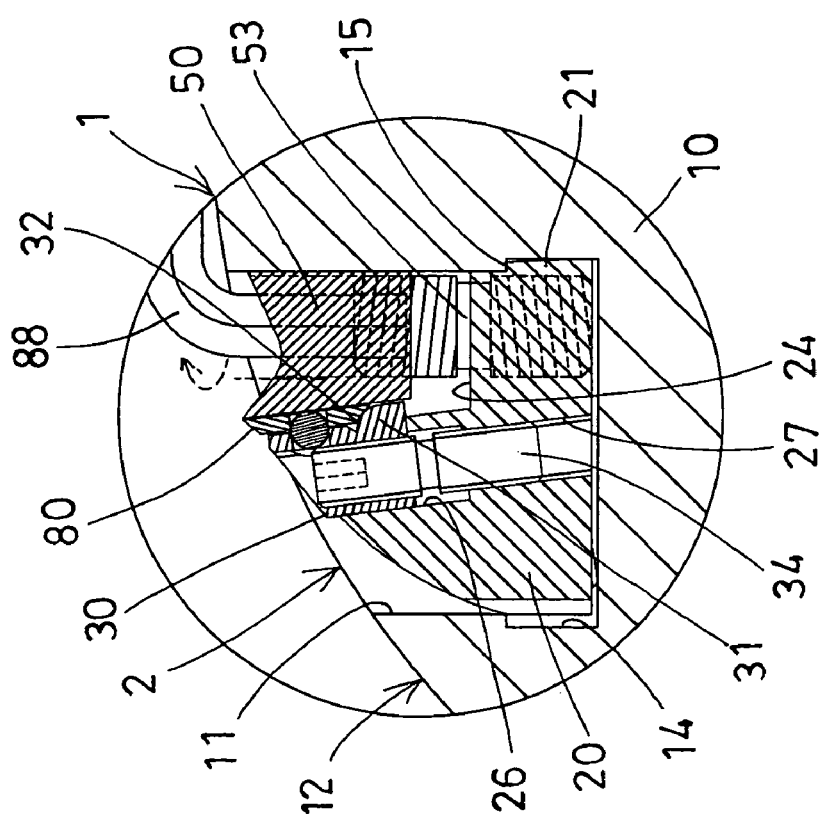
FIG. 5 is a partial cross sectional view similar to FIG. 4, illustrating the operation of the cutting tool carrying device.
Figure 6:
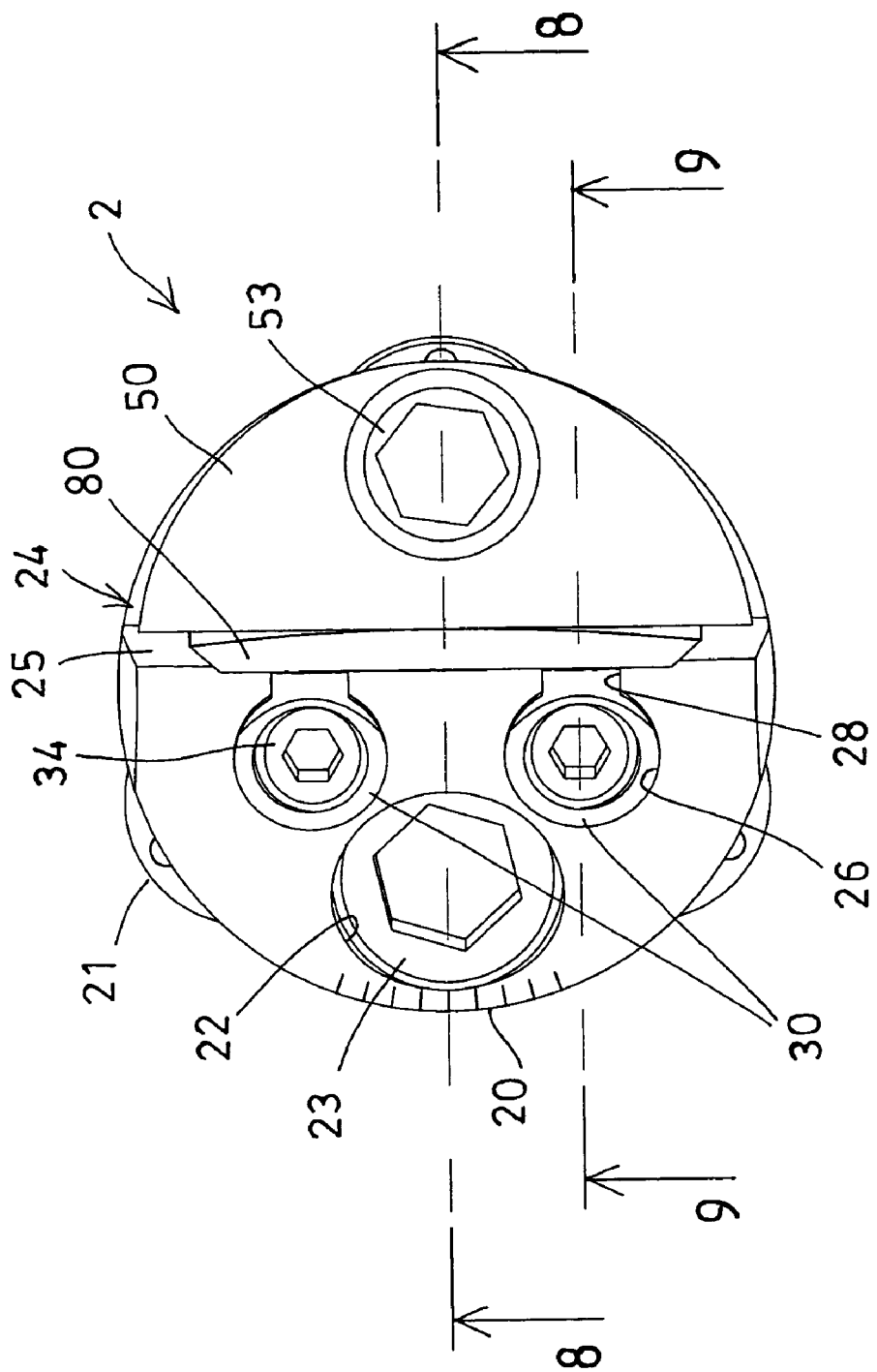
FIG. 6 is a further enlarged partial plan schematic view of a tool carrier of the cutting tool carrying device.
Figure 7:
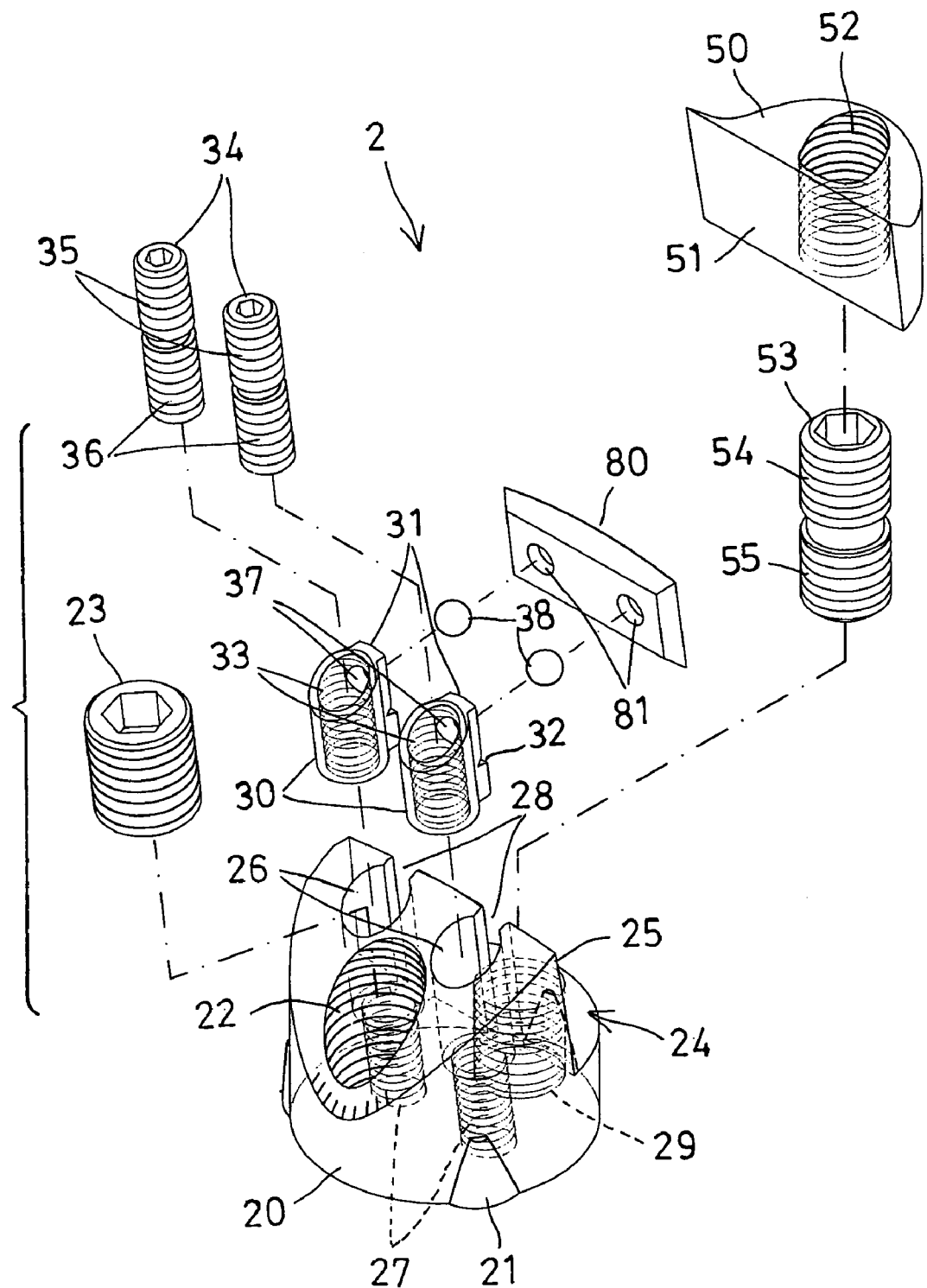
FIG. 7 is an exploded view of the tool carrier of the cutting tool carrying device.
Figure 9:
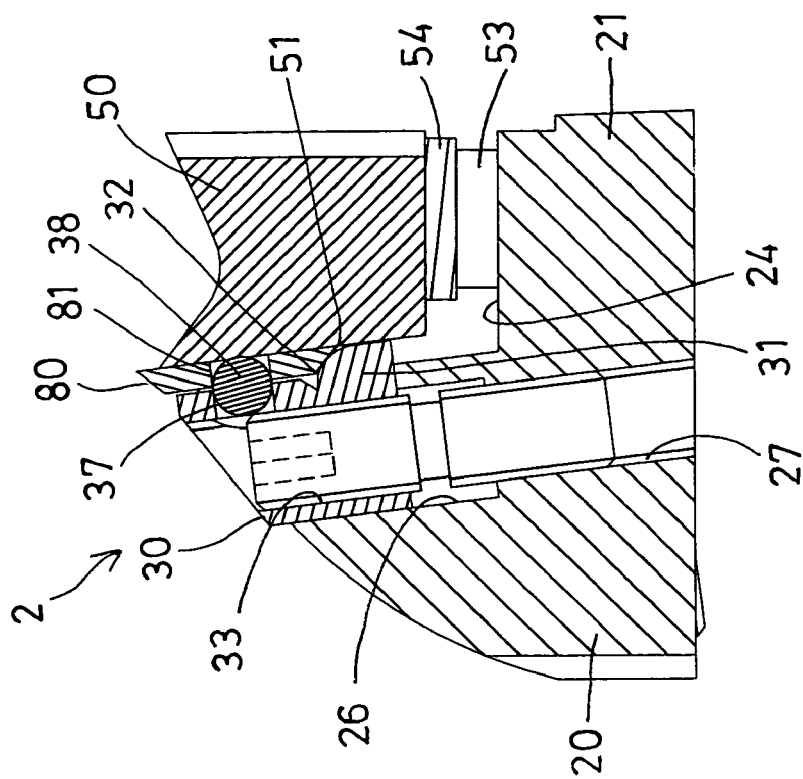
FIGS. 8, 9 are partial cross sectional views of the cutting tool carrying device taken along lines 8-8, and 9-9 of FIG. 6 respectively.

The base members 20 each include a cut-off portion 24 cut or formed therein for forming or defining an inclined or tilted carrying surface 25 therein, and one or more (such as two) orifices 26 longitudinally formed therein or substantially parallel to the screw hole 22 or the inclined or tilted carrying surface 25 of the base member 20, and one or more (such as two) further screw holes 27 longitudinally formed therein or substantially parallel to the screw hole 22 or the inclined or tilted carrying surface 25 of the base member 20 and aligned with or communicating with the orifices 26 of the base member 20 respectively. It is preferable that the screw holes 27 include an inner diameter smaller than that of the orifices 26 of the base member 20 respectively (FIGS. 4, 5, 9).

The base members 20 each further include one or more (such as two) channels 28 longitudinally formed therein and communicating with the cut-off portion 24 and the orifices 26 of the base member 20 for allowing the orifices 26 to be opened or communicating with the cut-off portion 24 of the base member 20. The base members 20 each further include a further screw hole 29 longitudinally formed therein or substantially parallel to the screw holes 22, 27 or the orifices 26 or the inclined or tilted carrying surface 25 of the base member 20 and communicating with the cut-off portion 24 of the base member 20.

One or more (such as two) slides or followers 30 are slidably engaged into the orifices 26 of the base member 20 respectively and each include a protrusion or seat 31 extended outwardly therefrom and slidably engaged into the channels 28 of the base member 20 respectively for guiding the followers 30 to slide or to move longitudinally along the orifices 26 of the base member 20 respectively and for preventing the followers 30 from being rotated relative to the base member 20. It is preferable that the followers 30 include an outer diameter equals to or slightly smaller than that of the orifices 26 of the base member 20 but greater than that of the screw holes 27 of the base member 20 for preventing the followers 30 from being engaged into the screw holes 27 of the base member 20.

The seats 31 of the followers 30 are slightly extended out of the channels 28 of the base member 20 respectively and each include a recess 32 formed therein for receiving or engaging with or for supporting the cutting member 80 (FIGS. 8, 9) and thus for allowing the cutting member 80 to be moved or adjusted up and down relative to the base member 20 by the followers 30. The followers 30 each include a screw hole 33 longitudinally formed therein (FIGS. 7, 9) for threadedly engaging with a bolt or fastener 34 which may be engaged with the base member 20 for acting as a moving or adjusting means to move or to adjust the followers 30 and thus the cutting member 80 up and down relative to the base member 20.

Figure 8:
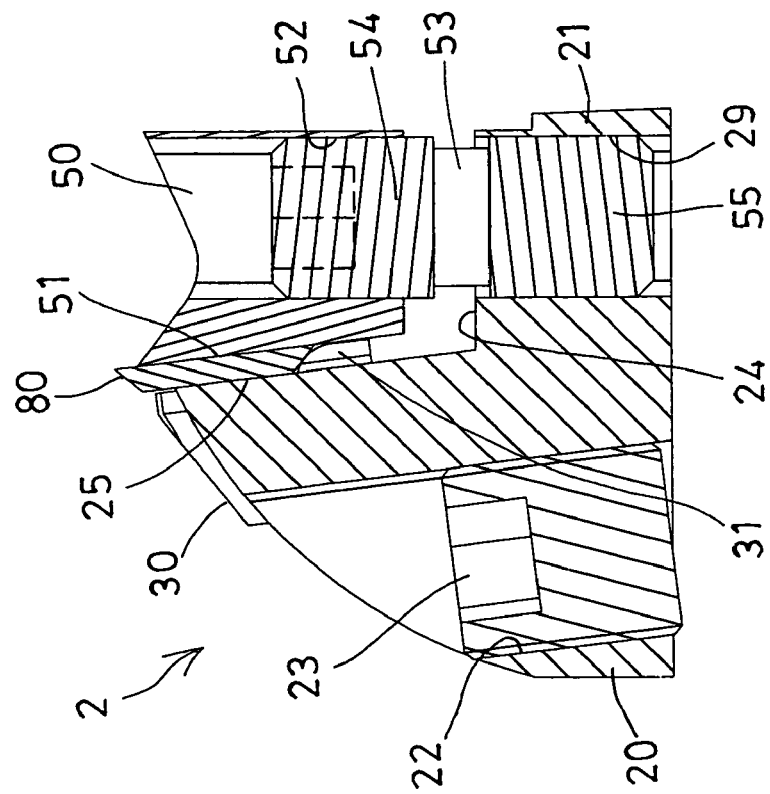

It is preferable that the fasteners 34 each include two threaded segments 35, 36 having opposite or different threading directions for threadedly engaging with the screw holes 33, 27 of the followers 30 and the base member 20 respectively. The followers 30 each further include an aperture 37 formed therein and communicating with the screw hole 33 of the follower 30 and formed through the seats 31 for slidably receiving a latch or spherical ball or detent 38 therein which may be engaged with the fasteners 34 and which may also be slidably engaged into the corresponding holes 81 of the cutting member 80 (FIGS. 4, 5, 9) for selectively anchoring or securing the cutting member 80 to the seats 31 of the followers 30. The cutting member 80 may also be engaged with or seated or supported on the inclined or tilted carrying surface 25 of the base member 20 (FIGS. 3, 8).

A pressing means or device 50 includes an inclined or tilted pressing surface 51 formed therein for engaging with the cutting member 80 or for forcing and securing the cutting member 80 to the base member 20. The pressing device 50 includes a screw hole 52 formed therein for threadedly engaging with a bolt or fastener 53 which may be engaged with the base member 20 for moving or adjusting the pressing device 50 up and down relative to the base member 20. It is preferable that the fastener 53 includes two threaded segments 54, 55 having opposite or different threading directions for threadedly engaging with the screw holes 52, 29 of the pressing device 50 and the base member 20 respectively and for moving or adjusting the pressing device 50 up and down relative to the base member 20.

Figure 3:
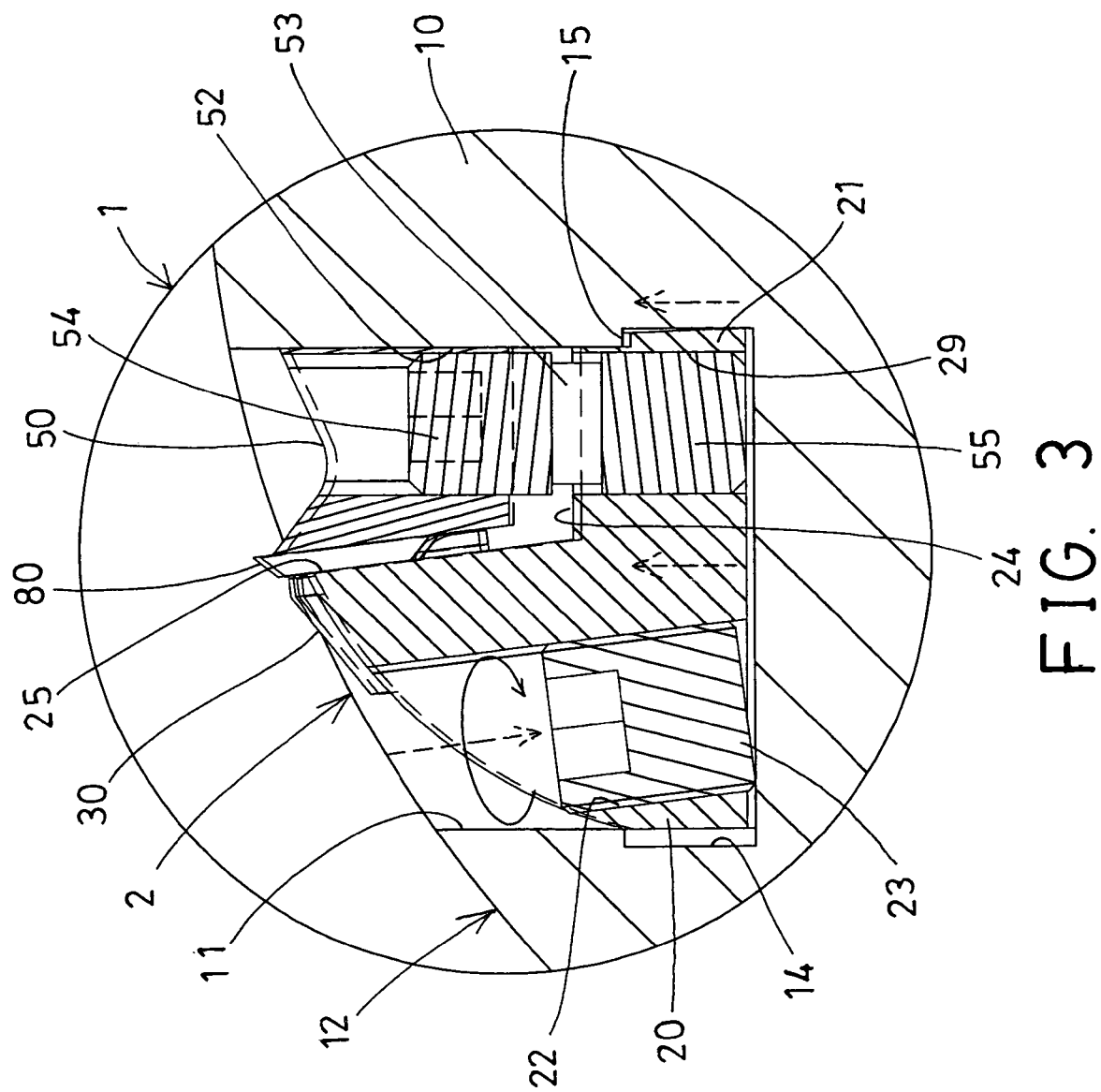
FIG. 3 is a partial cross sectional view of the cutting tool carrying device taken along lines 3-3 of FIG. 2.

In operation, as shown in FIGS. 3-5, the pressing device 50 may be moved or adjusted up and down relative to the base member 20 by the fastener 53, and the inclined or tilted pressing surface 51 of the pressing device 50 may be used to further solidly engage with the cutting member 80 in order to solidly force or press the cutting member 80 against the inclined or tilted carrying surface 25 of the base member 20 when the pressing device 50 is moved or adjusted downwardly toward the base member 20 by the fastener 53 (FIG. 5) with a driving tool device 88.

When it is required to move or adjust the cutting member 80 up and down relative to the base member 20, the pressing device 50 may be moved or adjusted upwardly away from the base member 20 by the fastener 53 (FIG. 4), and the follower 30 may then be moved or adjusted up and down relative to the base member 20 by the fasteners 34 with another driving tool device 90 (FIG. 5) in order to move or adjust the cutting member 80 up and down relative to the base member 20. The extending or protruding of the cutting member 80 out of the outer peripheral portion 12 of the carrying member 10 may thus be moved or adjusted with the fasteners 34, 53. The cutting member 80 may also be moved or adjusted to different angular position relative to the base member 20 and the outer peripheral portion 12 of the carrying member 10 when the fasteners 34 are adjusted to different height or depth relative to the base member 20.

Accordingly, the cutting tool carrying device in accordance with the present invention includes a blade carrier for allowing the cutting tools to be adjusted relative to the tool carrier to the suitable or selected positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cutting tool carrying device comprising:
   a carrying member including at least one compartment formed in an outer peripheral portion thereof,
   a base member fitted into said at least one compartment of said carrying member and including at least one orifice formed therein,
   a follower slidably engaged into said at least one orifice of said base membe,
   a cutting member attached to and supported on said follower and extended out of said outer peripheral portion of said carrying member, and
   means for adjusting said follower and said cutting member relative to said base member and said outer peripheral portion of said carrying member.

2. The cutting tool carrying device as claimed in claim 1, wherein said adjusting means includes a fastener threaded with said follower and said base member for moving said follower relative to said base member.

3. The cutting tool carrying device as claimed in claim 2, wherein said follower and said base member each include a screw holes formed therein for threading with said fastener.

4. The cutting tool carrying device as claimed in claim 3, wherein said fastener includes two threaded segments having different threading directions for threadedly engaging with said screw holes of said follower and said base member respectively.

5. The cutting tool carrying device as claimed in claim 1, wherein said base member includes at least one orifice formed therein for slidably receiving said follower.

6. The cutting tool carrying device as claimed in claim 5, wherein said base member includes a channel formed therein and communicating with said at least one orifice of said base member, and said follower includes a seat extended outwardly therefrom and slidably engaged into said channel of said base member for guiding said follower to slide along said at least one orifice of said base member and for preventing said follower from being rotated relative to said base member.

7. The cutting tool carrying device as claimed in claim 6, wherein said seat of said follower includes a recess formed therein for engaging with said cutting member and for supporting said cutting member.

8. The cutting tool carrying device as claimed in claim 6, wherein said follower includes an aperture formed therein and formed through said seat for slidably receiving a detent which is engageable with said cutting member.

9. The cutting tool carrying device as claimed in claim 8, wherein said cutting member includes at least one hole formed therein for slidably receiving said detent.

10. The cutting tool carrying device as claimed in claim 1, wherein said base member includes a cut-off portion formed therein for forming a carrying surface therein and for engaging with said cutting member.

11. The cutting tool carrying device as claimed in claim 1, wherein said base member includes a pressing device for engaging with said cutting member and for forcing said cutting member to said base member.

12. The cutting tool carrying device as claimed in claim 11, wherein said pressing device includes a pressing surface formed therein for engaging with said cutting member and for forcing said cutting member to said base member.

13. The cutting tool carrying device as claimed in claim 11, wherein said pressing device includes a fastener threaded with said base member for moving said pressing device relative to said base member.

14. The cutting tool carrying device as claimed in claim 13, wherein said pressing device and said base member each include a screw holes formed therein for threading with said fastener.

15. The cutting tool carrying device as claimed in claim 14, wherein said fastener includes two threaded segments having different threading directions for threadedly engaging with said screw holes of said pressing device and said base member respectively.

16. The cutting tool carrying device as claimed in claim 1, wherein said carrying member includes an inner peripheral space formed therein and communicating with said at least one compartment of said carrying member and having an inner diameter greater than that of said at least one compartment of said carrying member for forming an inner peripheral shoulder in said at least one compartment of said carrying member, and at least one slot formed in said at least one compartment and communicating with said at least one compartment and said inner peripheral space of said carrying member, said base member includes at least one catch extended outwardly therefrom for engaging with said at least one slot of said carrying member and for allowing said at least one catch of said base member to be engaged into said inner peripheral space of said carrying member.

17. The cutting tool carrying device as claimed in claim 16, wherein said base member includes a screw hole formed therein for threadedly engaging with a fastener which is engageable with said carrying member in order to force said base member to move relative to said carrying member and to force said at least catch of said base member to engaged with said inner peripheral shoulder of said carrying member and to anchor said base member to said carrying member.

* * * * *